May 26, 1964 E. W. BOLLMEIER 3,134,577

CONTAINER

Filed Feb. 2, 1962

INVENTOR
EMIL WAYNE BOLLMEIER
BY
Carpenter, Abbott, Coulter & Kinney
ATTORNEYS

United States Patent Office 3,134,577
Patented May 26, 1964

3,134,577
CONTAINER
Emil Wayne Bollmeier, St. Paul, Minn., assignor to Minnesota Mining and Manufacturing Company, St. Paul, Minn., a corporation of Delaware
Filed Feb. 2, 1962, Ser. No. 170,663
7 Claims. (Cl. 259—71)

This invention relates to the packaging of materials and has particular reference to the packaging of a plurality of different materials in separate compartments of a multiple-compartment container in which the several materials may when desired be mixed together for use. The invention is therefore useful in the packaging of such widely different commodities as hydraulic cements and plasters, self-curing rubbery sealers and coatings, and self-hardening resins. The invention is particularly useful in the mixing and handling of relatively large quantities of resins or resin-forming components which are self-hardening upon mixing and must be rapidly and uniformly mixed together in accurately adjusted proportions just prior to application. Self-hardening resinous compositions of this type are useful, for example, in encapsulating splice areas in electric power cables.

Figure 1:
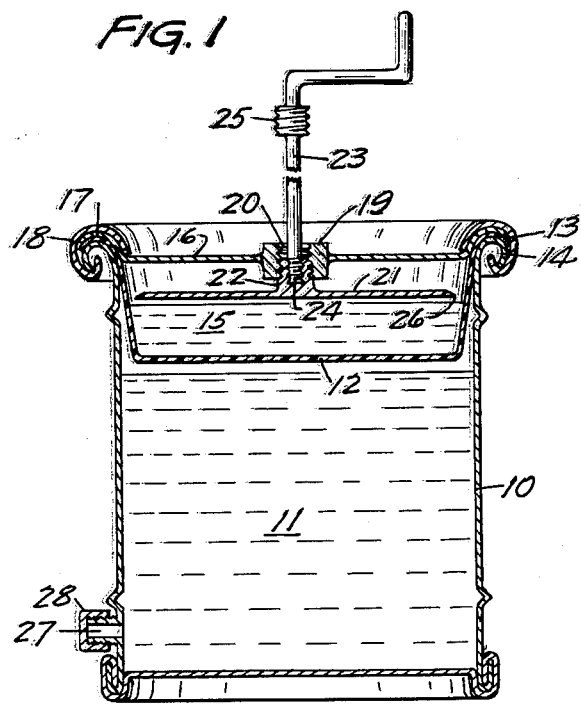
FIGURE 1 is a view in cross-section of a mixing container containing two materials suitable for intermixing and in condition for mixing and blending the two.

The container of FIGURE 1 comprises an outer member 10, for example in the form of a straight-sided metal pail of one- to five-gallon capacity, containing a quantity of a first material 11, and fitted at the top portion with an inner dependent bowl-shaped container 12 having a rim 13 fitted over the rolled edge 14 of the pail 10. The bowl 12 contains a second material 15 in correct proportion for admixture with the first material 11. A cover 16 is supported at its curved peripheral portion 17 over the rolled edge 14 and the fitted rim 13, being held in place by suitable sealing means such as the external clamping ring 18.

A tubular access member 19 is provided centrally of the cover 16, being internally threaded as indicated at 20. A flat disc-shaped mixer member 21 is retained in position in the upper portion of container 12 and just beneath the cover 16 by means of a centrally attached externally and internally threaded cup-shaped hub 22 which is screwed into the threaded tubular member 19, thereby effectively sealing the entire container.

A crank-shaped handle 23 having a threaded tip 24 and carrying a short enlarged externally threaded cylindrical element 25 near the crank end is supplied with the container. When mixing of the components is desired, the handle is first screwed into the threaded interior of the hub 22 which on continued turning of the handle is unscrewed from the access member 19, thus permitting the mixer member 21 to drop through the material 15 and into contact with the bowl 12. Upon contact of the mixer member with the container, the handle is further rotated, causing the sharpened edges 26 of the mixer member to cut through the walls of the bowl and permit the bottom segment thereof to be partially or completely detached from the side walls. The two materials 11 and 15 are thus permitted to come together, and uniform mixing is quickly attained by moving the mixer member 21 up and down in the manner of a dasher by means of the attached handle 23. Where the contents of the container are viscous adherent liquids, a close-fitting wiper ring may be supplied, being inserted in a groove cut for the purpose in the outer threaded interior of the access member 19. As soon as the mixing operation is complete, the mixer member 21 is forced to the bottom of the container 10 and held in that position by further turning of the handle, causing the threaded element 25 to be engaged with threaded interior of the access member 19. The mixed contents are then drained from the container, for example through the port 27 after removal of the cap 28 therefrom. Alternatively, the container 10 may be punctured with a suitable instrument, and then discarded after emptying.

Figure 2:
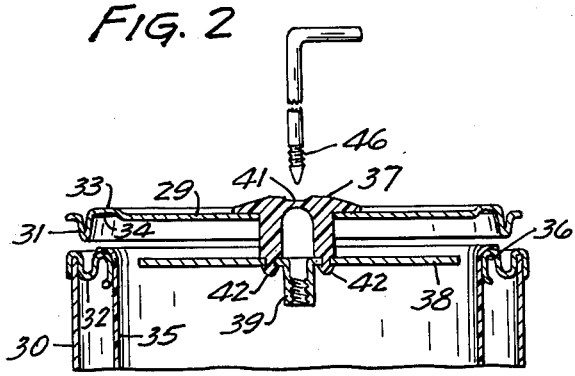
FIGURES 2 and 3 are detail views in cross-section of alternate forms of closure and mixer members.
Figure 5:
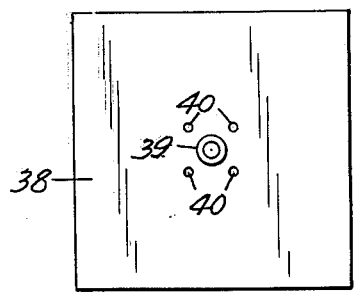

An alternative structure is illustrated in FIGURE 2. A friction-fit cover 29 forms a ring seal at the periphery of the container 30 through the action of the closely fitting friction ring 31 and matching groove 32. The shallow groove 33 of the cover 29 preferably carries a bead of plastic putty or sealer 34 which forms a firm seal between the cover and the inner bowl-like container 35 where the latter fits against the rounded inner portion 36 of the upper edge of container 30. Centrally of the cover 29 there is inserted, through a central hole provided for the purpose, a close-fitting rubber or plastic flanged cup-like plug member 37 on the lower portion of which is then supported a mixer member 38. The latter, as shown in bottom plan view in FIGURE 5, consists of a square sheet of metal having an internally threaded central tubular extension 39 and provided with a plurality of apertures 40 radially of the central extension for attachment to the supporting plug member 37. A thin puncturable membrane 41 seals the outer end of the central bore of the plug 37 and effectively prevents loss of any of the material contained in the inner container 35.

In use, a terminally threaded and pointed rod-like handle 46 is forced through the membrane 41 and is screwed into the threaded extension 39 of the mixer member 38, which is then forcibly disengaged from the plug 37, e.g. by shearing the holding pins 42; or, where the pins are frictionally retained within the narrow portions of keyhole-shaped apertures, by twisting the member 38 to the release position. Mixing and blending of the contents, and delivery of the mixture, is then accomplished as previously described in connection with the apparatus of FIGURE 1. The edges of the hole formed through the membrane 41 and surrounding the rod 46 are sufficiently tightly fitting to provide a wiping action as the rod is forced up and down through the fitting, thus preventing any significant loss of contents at that point.

The disc 21 of FIGURE 1 is circular in form and has a beveled, sharpened edge 26. The mixer member 38 of FIGURES 2 and 5 will be seen to be in the form of a square in which the sharp corners act as cutting means for removing the bottom portion of the bowl-shaped container 35 in the mixing and blending operation. The mixer member 43 of FIGURE 4 illustrates a further alternative shape which is particularly advantageous in the mixing of highly viscous materials such as doughs or putties. The star-shaped plate is provided with an internally threaded open central extension 44, and each branch of the star carries a cutting tooth 45 at its outward extremity. Additional cutting teeth are provided in the mixer member 47 of FIGURES 3 and 6.

Figure 3:
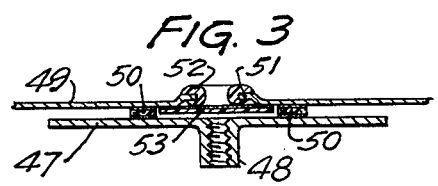
Figure 4:
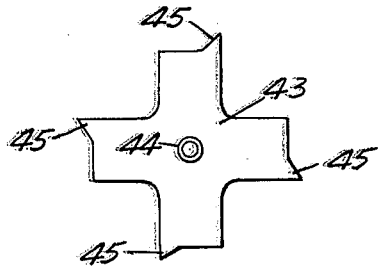
FIGURES 4, 5 and 6 are plan views illustrating different forms of mixer members.

The structure illustrated in FIGURE 3, and which is preferred as requiring fewer machined or molded parts and therefore being more economically produced, includes a dasher or mixer member 47 provided with a threaded central tubular extension 48, the dasher being releasably fastened to the cover 49 by means of segments 50 of double-coated pressure-sensitive adhesive tape having a compressible sponge-like central layer of reduced tensile strength between the two surface layers of adhesive. The cover 49 is centrally raised and perforated, the raised edge 51 of the perforation being covered with a rubber grommet 52. A disc of solvent-resistant plastic pressure-sensitive adhesive tape 53 is adhered to the undersurface of the cover 49 surrounding the perforated center and serves as a closure. In use, the threaded end of a suitable rod-like handle such as handle 46 of FIGURE 2 is forced through the tape segment 53 and is screwed into the threaded extension 48; the tape segments 50 are split along a central plane of the sponge-like central layer by additional twisting or bending forces applied to the handle; and mixing and pouring of the contents is accomplished as previously described. The tape fragments remain adhesively attached to the cover and dasher surfaces and do not mix into the contents. The wiping action of the grommet 52 against the handle prevents loss of contents at that point and frictionally retains the handle and dasher in position as the contents are removed.

Figure 6:
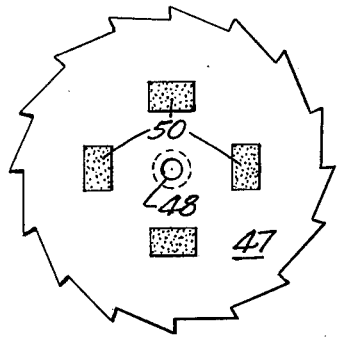

The dasher 47 of the assembly of FIGURE 3 is illustrated in top plan view in FIGURE 6 as having a sawtooth cutting edge and with four tape segments 50 uniformly arranged around the center. A few small uniformly distributed segments of tape are ordinarily sufficient to provide adequate holding ability and are preferred, but where necessary larger areas may be used. The substitution for the several separate segments of a single narrow annular ring of the double-coated tape provides both for bonding the dasher to the cover and for preventing flow of contents between dasher and cover to the central opening; in such case the tape segment 53 may equally well be applied to the central area of the dasher rather than to the cover as illustrated. Alternatively, a single disc of the double-coated tape may serve both as the disruptable ring seal between dasher and cover and also as the central puncturable disc seal covering the central opening of the cover. As a specific example of an adhesive sheet product which has been found particularly applicable to such use there may be employed a sheet of low density polyurethane foam about one-sixteenth inch in thickness and coated on both major surfaces with a thin layer of a pressure-sensitive tape adhesive copolymer of acrylate esters and acrylic acid.

The compressible sponge-like center of the double-coated pressure-sensitive adhesive tape provides for full conformability between cover and dasher. The adhesive layers therefore attain maximum adhesion to both surfaces. The sponge-like layer is sufficiently strong to hold the dasher firmly in place under all normal strains but is incapable of withstanding the additional severe strain deliberately imposed through the inserted handle member by an operator. It will be appreciated that tape products used in this manner must be selected so as to be adequately resistant to the liquid or other contents of the container.

As previously indicated, the container 10 may desirably take the form of a metal pail, those of 1–5 gallon capacity being particularly useful where mixtures of interreactive resin-forming components are to be packaged. Containers of larger or smaller capacities may also be used. Depending on the specific materials to be contained therein, the deep drawn bowl-like inner container may be constructed either of metal, for example of thin aluminum, or of plastics such as cellulose acetate-butyrate or polyvinyl chloride, or of other film-forming materials capable of containing the contents of the package and of being cut or torn by the action of the dasher. The fitted rim formed on such plastic container may be made sufficiently smooth and uniform so that it will itself serve as an effective gasket between the rolled or grooved edge of the container and the appropriately shaped periphery of the cover. Where a rough or irregular rim is produced on the bowl, for example in the case of an aluminum structure of the nature of an aluminum pie plate, it is ordinarily necessary to provide an additional sealing agent on both surfaces of such rim, as indicated in connection with FIGURE 2. The sealing agent must also be so selected as to be unaffected by the resins or other contents of the container.

I claim:

1. A multiple-compartment storing and mixing device comprising an open-ended outer container, an open-ended inner container, a cover, a generally flat sharp-edged mixing member, fastener means for centrally engaging said mixing member with said cover and within said inner and outer containers, and handle means attachable to said mixing member for disengaging said mixing member from said cover and for forcing said mixing member through said inner container.

2. A multiple-compartment storing and mixing device comprising an open-ended outer container having a peripheral rim, an open-ended inner container dependent from said rim, a cover fitting over said rim and provided with a central opening, a flat dasher having central handle-accepting means and peripheral cutting means, and disengageable fastener means for engaging said dasher with said cover and within said inner and outer containers.

3. A multiple-compartment storing and mixing device comprising an open-ended rigid outer container having a peripheral rim, an open-ended bowl-shaped inner container dependent from and closely fitting said rim, a cover having an opening, means for sealing said cover to said inner and outer containers at said rim, a dasher having handle-engaging means, disengageable fastener means for engaging said dasher with said cover and with said handle-engaging means in alignment with said opening, and closure means for preventing escape of contents through said opening.

4. For use on a multiple-compartment container as herein described, a cover and mixer assembly comprising a cover member having a central internally screw threaded tubular access member, and a flat sharp-edged dasher member having an externally and internally screw threaded cup-shaped hub, said hub fitting into and in threaded engagement with the inner end portion of said access member and with its internally threaded surface accessible through said access member for engagement with the outer end portion of a terminally screw-threaded crank or handle member.

5. For use on a multiple-compartment container as herein described, a cover and mixer assembly comprising a centrally perforated cover member, a centrally puncturable resilient plug for said perforated cover, and a flat disc-shaped sharp-edged dasher member having a central handle-receiving hub and releasably suspended from said plug with said hub in position to receive a handle introduced through said plug by puncture thereof.

6. For use on a multiple-compartment container as herein described, a cover and mixer assembly comprising a centrally perforated cover member, a flat disc-shaped dasher member having a central handle-receiving hub, temporary closure means for preventing loss of contents through said perforated cover, and adherent fastening means for releasable suspending said dasher from said cover in position for receiving in said hub a handle member introduced through said perforated cover.

7. In a multiple-compartment storing and mixing device comprising an open-ended outer container having a peripheral rim, an inner container dependent from said rim, a cover fitting over said rim and provided with a central opening, and a flat dasher within said inner container and provided with edge means for cutting through said inner container, the improvement comprising a centrally open tubular hollow plug for said opening, means for temporarily rigidly supporting said dasher from said plug, means attached to said plug for closing the central opening thereof, and mixer handle means attachable through the central opening of said plug to said dasher.

References Cited in the file of this patent
UNITED STATES PATENTS

| | | |
|---|---|---|
| 1,022,830 | Noon | Apr. 9, 1912 |
| 1,644,821 | Eckhart | Oct. 11, 1927 |
| 2,735,590 | Ayres | Feb. 21, 1956 |
| 2,964,290 | Mueller | Dec. 13, 1960 |

UNITED STATES PATENT OFFICE
CERTIFICATE OF CORRECTION

Patent No. 3,134,577                                   May 26, 1964

Emil Wayne Bollmeier

It is hereby certified that error appears in the above numbered patent requiring correction and that the said Letters Patent should read as corrected below.

Column 4, lines 59 and 60, for "said access member for engagement with the outer end portion of" read -- the outer end portion of said access member for engagement with --.

Signed and sealed this 20th day of October 1964.

(SEAL)
Attest:

ERNEST W. SWIDER                                         EDWARD J. BRENNER
Attesting Officer                                            Commissioner of Patents